(12) United States Patent
Soeffker et al.

(10) Patent No.: US 9,474,339 B2
(45) Date of Patent: Oct. 25, 2016

(54) CONNECTING DEVICE, ASSEMBLY AND METHOD FOR MANUFACTURING AN ASSEMBLY

(71) Applicant: Airbus Operations GmbH, Hamburg (DE)

(72) Inventors: Axel Soeffker, Hamburg (DE); Hermann Benthien, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 201 days.

(21) Appl. No.: 14/076,423

(22) Filed: Nov. 11, 2013

(65) Prior Publication Data

US 2014/0059813 A1 Mar. 6, 2014

Related U.S. Application Data

(63) Continuation of application No. PCT/EP2012/002041, filed on May 11, 2012.

(60) Provisional application No. 61/485,666, filed on May 13, 2011.

(51) Int. Cl.
*A44B 18/00* (2006.01)
*B23P 11/00* (2006.01)
(Continued)

(52) U.S. Cl.
CPC ......... *A44B 18/0073* (2013.01); *B29C 65/562* (2013.01); *B29C 65/564* (2013.01); *B29C 66/431* (2013.01); *B29C 66/43441* (2013.01);
(Continued)

(58) Field of Classification Search
CPC ... B29C 65/56; B29C 65/562; B29C 65/564; B29C 65/62; B29C 65/72; B29C 65/76; B29C 66/05; B29C 66/11; B29C 66/112; B29C 66/118; B29C 66/1182; B29C 66/72; B29C 66/721; B64C 1/12; B64C 3/20; B64C 3/26; A44B 18/008; Y10T 29/49947; Y10T 29/49948; Y10T 29/4995; Y10T 29/49959; Y10T 29/49966; Y10T 29/49968
See application file for complete search history.

(56) References Cited

U.S. PATENT DOCUMENTS 3,192,589 A * 7/1965 Pearson .......................... 24/452
3,408,705 A * 11/1968 Kayser et al. .................. 24/452
(Continued)

FOREIGN PATENT DOCUMENTS

DE 102004001078 7/2005
DE 102007062111 7/2009
(Continued)

OTHER PUBLICATIONS

International Search Report, Jan. 10, 2013.

*Primary Examiner* — Essama Omgba
(74) *Attorney, Agent, or Firm* — Greer, Burns & Crain Ltd.

(57) ABSTRACT

A connecting device for manufacturing a peeling-stress-resistant connection between two components. The connecting device includes a carrier, which has a first surface and a second surface opposing the first surface. The connecting device further includes a plurality of hook and loop elements which extend both from the first and the second surface of the carrier and each have at their free ends facing away from the first or the second surface of the carrier a hook and loop head, which is arranged to enter into a hook and loop connection with a component comprising a fiber-reinforced composite material.

16 Claims, 7 Drawing Sheets

(51) Int. Cl.

| | | |
|---|---|---|
| *F16B 5/07* | (2006.01) | |
| *B29C 65/56* | (2006.01) | |
| *B29C 70/54* | (2006.01) | |
| *B29C 70/68* | (2006.01) | |
| *B29C 70/88* | (2006.01) | |
| B29L 31/30 | (2006.01) | |
| B29C 65/00 | (2006.01) | |

(52) U.S. Cl.
CPC ........... *B29C 66/721* (2013.01); *B29C 70/543* (2013.01); *B29C 70/68* (2013.01); *B29C 70/882* (2013.01); *F16B 5/07* (2013.01); *B29C 66/1122* (2013.01); *B29C 66/71* (2013.01); *B29C 66/7212* (2013.01); *B29C 66/72141* (2013.01); *B29C 66/72143* (2013.01); *B29C 66/73941* (2013.01); *B29L 2031/3076* (2013.01); *Y02T 50/433* (2013.01); *Y10T 24/2717* (2015.01); *Y10T 29/4995* (2015.01); *Y10T 29/49947* (2015.01); *Y10T 29/49948* (2015.01); *Y10T 29/49966* (2015.01); *Y10T 29/49968* (2015.01)

(56) References Cited

U.S. PATENT DOCUMENTS

| | | | | |
|---|---|---|---|---|
| 4,239,829 A | * | 12/1980 | Cohen | 428/86 |
| 4,528,051 A | * | 7/1985 | Heinze et al. | 156/92 |
| 4,759,812 A | * | 7/1988 | Miller | 156/98 |
| 5,212,853 A | * | 5/1993 | Kaneko | 24/452 |
| 5,242,646 A | * | 9/1993 | Torigoe et al. | 264/219 |
| 5,286,431 A | * | 2/1994 | Banfield et al. | 264/134 |
| 5,589,015 A | * | 12/1996 | Fusco et al. | 156/73.1 |
| 5,656,351 A | * | 8/1997 | Donaruma | 428/97 |
| 5,679,302 A | * | 10/1997 | Miller et al. | 264/167 |
| 5,731,056 A | * | 3/1998 | Butler, III | 428/100 |
| 5,736,222 A | * | 4/1998 | Childress | 428/119 |
| 5,832,594 A | * | 11/1998 | Avila | 29/798 |
| 5,863,635 A | * | 1/1999 | Childress | 428/119 |
| 5,876,540 A | * | 3/1999 | Pannell | 156/91 |
| 5,876,832 A | * | 3/1999 | Pannell | 428/119 |
| 5,919,413 A | * | 7/1999 | Avila | 264/249 |
| 5,935,698 A | * | 8/1999 | Pannell | 428/223 |
| 5,968,639 A | * | 10/1999 | Childress | 428/223 |
| 5,980,665 A | * | 11/1999 | Childress | 156/92 |
| 6,112,377 A | * | 9/2000 | Wilson | 24/452 |
| 6,124,015 A | | 9/2000 | Baker et al. | |
| 6,190,602 B1 | * | 2/2001 | Blaney et al. | 264/443 |
| 6,291,049 B1 | * | 9/2001 | Kunkel et al. | 428/99 |
| 6,436,507 B1 | * | 8/2002 | Pannell | 428/102 |
| 6,514,593 B1 | * | 2/2003 | Jones et al. | 428/100 |
| 6,687,962 B2 | * | 2/2004 | Clarner et al. | 24/452 |
| 6,821,368 B2 | * | 11/2004 | Benson et al. | 156/92 |
| 7,018,496 B1 | * | 3/2006 | George et al. | 156/152 |
| 7,032,278 B2 | * | 4/2006 | Kurtz, Jr. | 24/442 |
| 7,244,487 B2 | * | 7/2007 | Brantley et al. | 428/119 |
| 8,745,827 B2 | * | 6/2014 | Rocha | 24/442 |
| 8,850,692 B2 | * | 10/2014 | Han | 29/700 |
| 8,894,013 B2 | * | 11/2014 | Benthien et al. | 244/131 |
| 2004/0067342 A1 | * | 4/2004 | Shepard et al. | 428/182 |
| 2004/0213953 A1 | * | 10/2004 | Brantley et al. | 428/119 |
| 2005/0042023 A1 | | 2/2005 | Jones | |
| 2008/0193709 A1 | * | 8/2008 | Han | 428/100 |
| 2012/0011685 A1 | * | 1/2012 | Rocha | 24/449 |
| 2013/0125354 A1 | * | 5/2013 | Benthien et al. | 24/443 |
| 2013/0149501 A1 | * | 6/2013 | Pacchione et al. | 428/172 |
| 2014/0017037 A1 | * | 1/2014 | Plokker | 411/501 |

FOREIGN PATENT DOCUMENTS

| | | | |
|---|---|---|---|
| DE | 102008032834 | 1/2010 | |
| DE | 102009047671 A1 * | 6/2011 | ............ B29C 65/48 |
| EP | 1657453 A2 * | 5/2006 | ............ F16B 11/00 |
| WO | WO 2012113742 A1 * | 8/2012 | ............ B29C 65/60 |

* cited by examiner

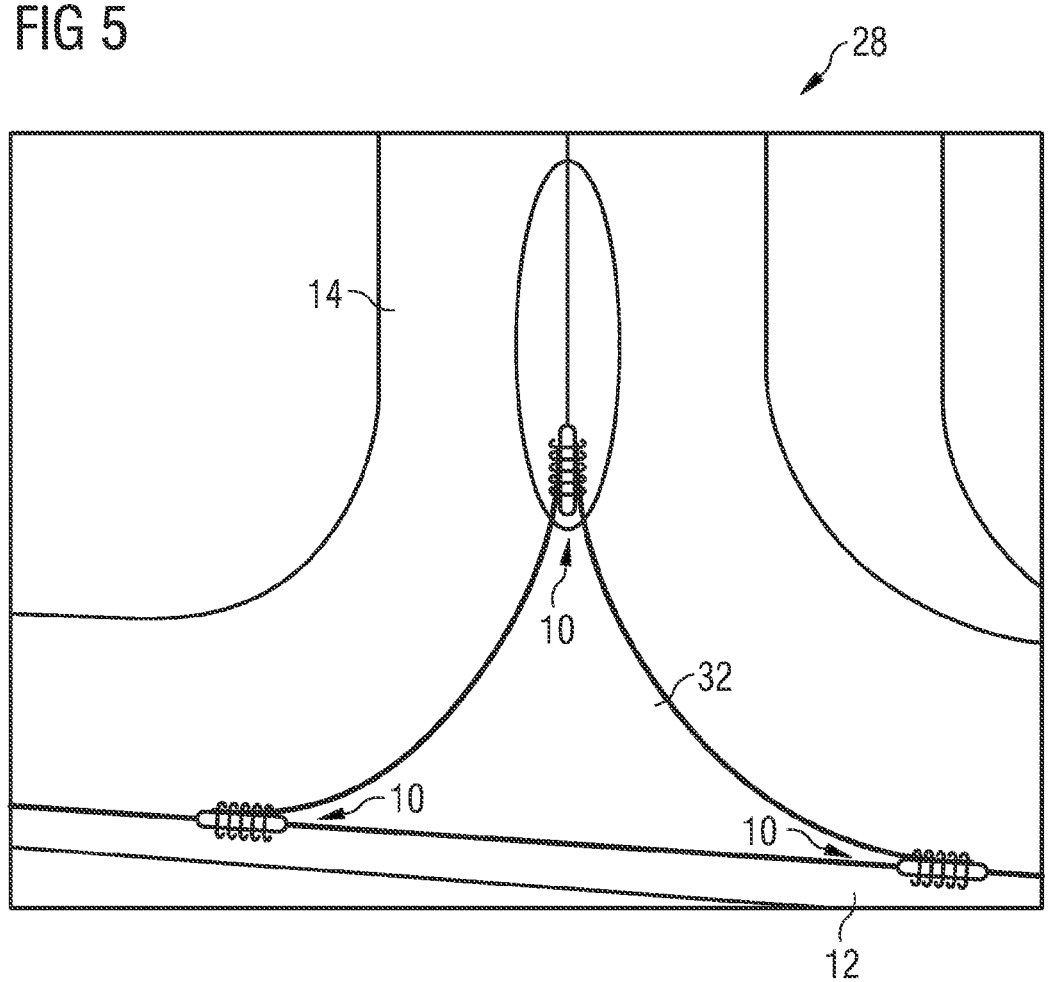

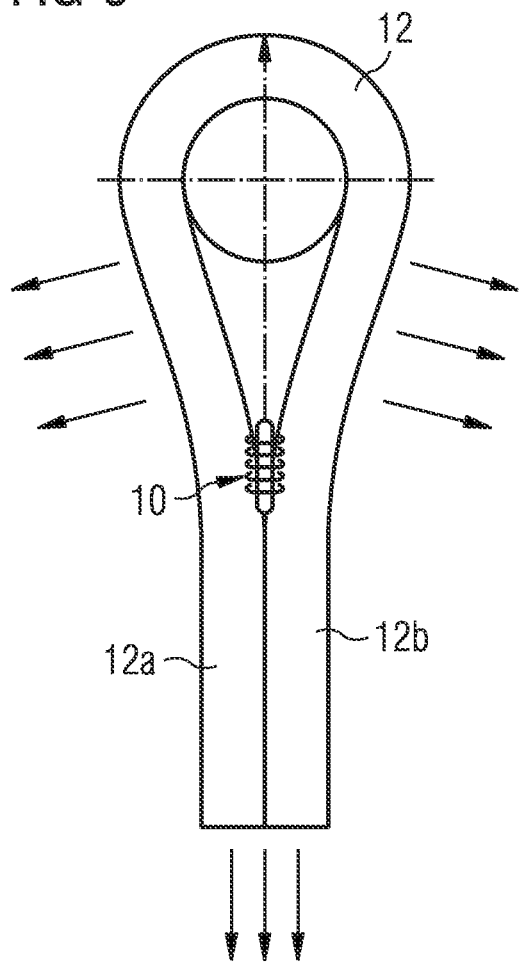

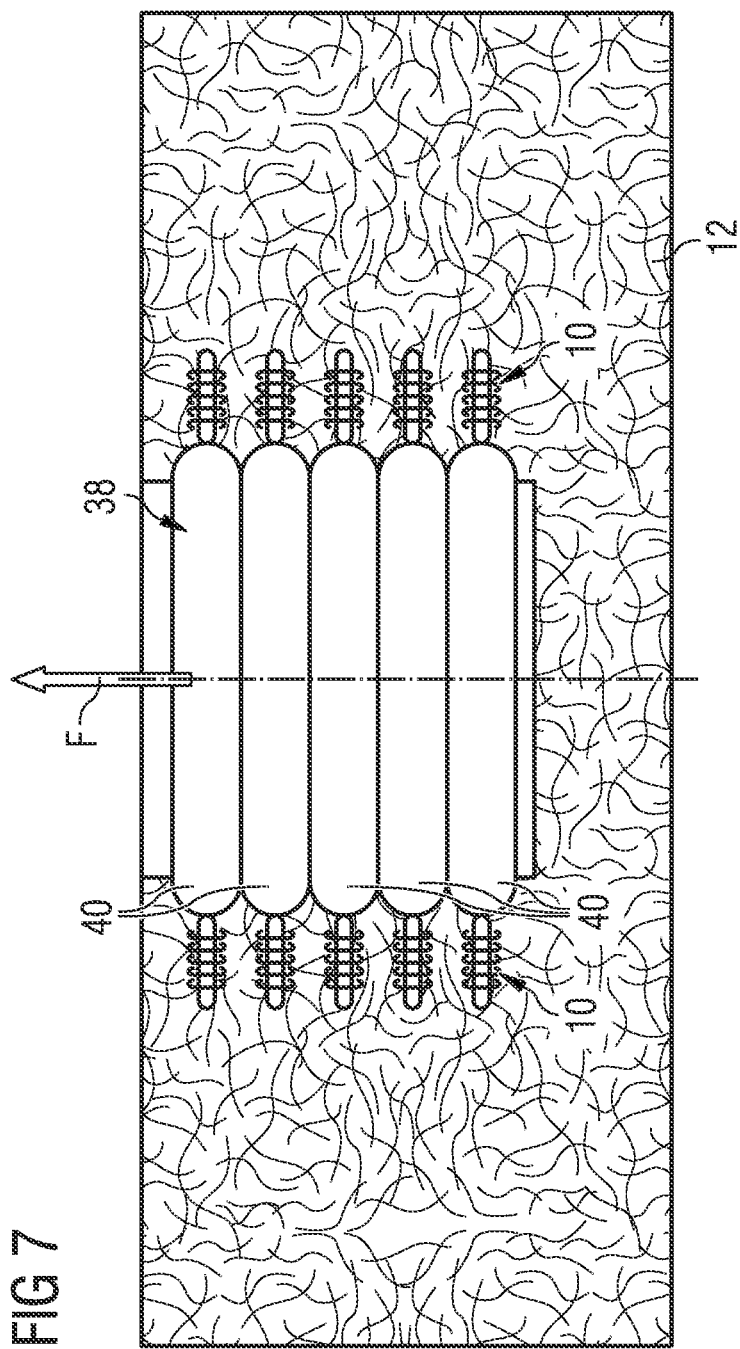

CONNECTING DEVICE, ASSEMBLY AND METHOD FOR MANUFACTURING AN ASSEMBLY

CROSS-REFERENCES TO RELATED APPLICATIONS

This application is a continuation of International Application PCT/EP2012/002041 filed May 11, 2012, designating the United States and published on Nov. 22, 2012 as WO 2012/156061. This application also claims the benefit of the U.S. Provisional Application No. 61/485,666, filed on May 13, 2011, and of the German patent application No. 10 2011 101 456.3 filed on May 13, 2011. The entire disclosures of the above are incorporated herein by way of reference.

BACKGROUND OF THE INVENTION

The invention relates to a connecting device, which is suitable for manufacturing and/or reinforcing a connection between two components, in particular two aircraft structural components. Furthermore, the invention relates to an assembly, in particular an aircraft structural assembly, in which a connection between two components is established and/or reinforced by means of such a connecting device. Finally, the invention relates to a method for manufacturing such an assembly.

In aircraft construction there are endeavours to use increasingly components that consist completely or partly of fiber-reinforced composite materials, for example carbon-fiber-reinforced plastics (CFRP), as load-bearing components. For example, DE 10 2007 062 111 A1 describes a cross-member structure consisting of carbon-fiber-reinforced plastic, which cross-member serves to support the individual panels of an aircraft floor system for separating a passenger cabin from a cargo hold arranged underneath the passenger cabin. Furthermore, it is known from
DE 10 2004 001 078 A1, for example, to provide fuselage segments with a skin of fiber-reinforced composite materials executed in sandwich construction. Finally,
DE 10 2008 032 834 A1 relates to a stiffening component consisting of a fiber-reinforced composite material and formed for example in the form of an Omega stringer.

To manufacture aircraft structural components from fiber-reinforced composite materials, a multilayer laminate is normally first built up from fiber prepregs. The fiber prepregs comprise a woven or non-woven fabric of reinforcing fibers, which are usually provided with a surface layer of an unhardened duroplastic plastic material, for example an epoxy resin material. The laminate can be constructed manually or automatically. The duroplastic plastic material applied to the surfaces of the fibers is then hardened in an autoclave cycle under pressure and/or at an increased temperature, so that a composite material with a matrix of hardened duroplastic plastic and reinforcing fibers incorporated into the matrix is created. To connect two aircraft structural components consisting of fiber-reinforced composite materials, adhesive joints can be used. Alternatively to this, the components can be brought into contact with one another in the unhardened state and then hardened together.

SUMMARY OF THE INVENTION

The invention is aimed at the object of providing a connecting device for manufacturing a peeling-stress-resistant connection between two components comprising a fiber-reinforced composite material, in particular two aircraft structural components. Furthermore, the invention is aimed at the object of specifying an assembly with two components connected to one another by a peeling-stress-resistant connection and a method for manufacturing such an assembly.

A connecting device according to the invention, which is suitable for manufacturing a peeling-stress-resistant connection between two components of a fiber-reinforced composite material, in particular two components provided for use in aircraft construction, comprises a carrier, which has a first surface and a second surface opposing the first surface. Two large-area main surfaces of the carrier preferably serve as first and second surface. In other words, the carrier is preferably formed two-dimensionally, this means comparatively thin in relation to the area of the first and the second surface, so that the first and the second surface of the carrier are at a comparatively small distance from one another. The shape of the carrier may be adapted to the respective purpose of use of the connecting device. For example, a ribbon-like or also a large-area round, square or other configuration of the carrier is conceivable.

The connecting device according to the invention further comprises a plurality of hook and loop elements, which extend both from the first and from the second surface of the carrier. This means that in the connecting device according to the invention, the carrier is provided with hook and loop elements in the area of both main surfaces. At their free ends facing away from the first or the second surface, the hook and loop elements each have a hook and loop head, which is arranged to enter into a hook and loop connection with a component comprising a fiber-reinforced composite material. In other words, the hook and loop heads of the hook and loop elements are designed such that they can enter into a hook and loop connection either with the matrix, but preferably with the fibers, which are integrated into a component comprising a fiber-reinforced composite material, in order to hook-and-loop fasten the connecting device to the component.

Due to being equipped with hook and loop elements both in the area of its first surface and in the area of its second surface, the connecting device according to the invention is suitable to be connected to two components and thereby to produce a hook and loop connection between the two components. The two components that are connected to one another by means of the connecting device through a hook and loop connection can be two components formed separately from one another. Alternatively to this, however, the connecting device according to the invention may also be used to connect two sections of just one component to one another. Finally, the connecting device may be used to close cuts or slits introduced into a component made from a fiber-reinforced composite material. In the context of this application, the term "two components" thus describes not only two components formed separately from one another, but also various sections of just one component.

Due to the hook and loop elements of the connecting device according to the invention, a direct, non-yielding load path is created in the area of the boundary surface between the two components or component sections, via which stresses acting on the components or component sections can be channelled away. Due to the hook and loop elements of the connecting device, the boundary surface between the two components thus acquires a much higher stiffness than a pure adhesive joint or a connection arising through joint hardening of the components comprising a fiber-reinforced composite material. A boundary surface produced by means of the connecting device according to the invention between two components or two component sections is especially peeling-stress-resistant, therefore. The use of the connecting device according to the invention thus makes it possible to manufacture assemblies that are much more resistant to failure.

The hook and loop elements of the connecting device according to the invention can extend from the first or the second surface of the carrier substantially perpendicular to the first or the second surface of the carrier. Alternatively to this, however, it is also conceivable to orient the hook and loop elements at an angle smaller than 90o relative to the first or the second surface of the carrier. As will be explained in greater detail later, it is sensible to adapt the orientation of the hook and loop elements of the connecting device to the orientation of the fibers in the components comprising a fiber-reinforced composite material, which components are to be connected to one another by means of the connecting device.

At least a portion of the hook and loop heads of the hook and loop elements may be formed hook-shaped. Hook and loop elements with a hook-shaped hook and loop head may thus comprise a substantially pin-shaped section, which extends from the first or the second surface of the carrier. This pin-shaped section may be formed in one piece with the hook-shaped hook and loop head. A free end of the hook-shaped hook and loop head preferably faces the first or the second surface of the carrier. Hook-shaped hook and loop heads can be caught in a simple and convenient manner with the fibers, which are integrated into the fiber composite material components or fiber composite material component sections to be connected to one another by means of the connecting device according to the invention. A particularly secure connection between the components or component sections is created thereby. Depending on the purpose of use of the connecting device and configuration of the components or component sections to be connected to one another, the free ends of the hook-shaped hook and loop heads may be executed to be sharp or blunt.

In an alternative embodiment of the connecting device according to the invention, at least a portion of the hook and loop elements may be provided with hook and loop heads that are formed spherical, ellipsoid or cuboid in shape. In contrast to hook-shaped hook and loop heads, hook and loop heads that are spherical, ellipsoid or cuboid in shape are gentler on the fibers, meaning that the danger of damage occurring to the fibers incorporated into the components to be connected to one another by means of the connecting device is smaller here. It is understood that the connecting device, depending on the requirement, may comprise hook and loop elements with different hook and loop heads. For example, a part of the hook and loop elements may have hook-shaped hook and loop heads and a portion of the hook and loop elements may have hook and loop heads that are spherical, ellipsoid or cuboid in shape.

In a preferred embodiment, the connecting device according to the invention further comprises a plurality of securing elements. Each securing element is preferably assigned to a hook and loop element and extends adjacent to the hook and loop element from the first and/or the second surface of the carrier. The hook and loop element and the securing element assigned to the hook and loop element are preferably aligned parallel to one another. Free ends of the securing elements facing away from the first or the second surface are preferably each arranged at a shorter distance from the first or the second surface of the carrier than the hook and loop head of the hook and loop element. Due to the securing elements, fibers of the components or component sections to be connected to one another by means of the connecting device that are caught with the hook and loop heads of the hook and loop elements are kept in contact with the hook and loop heads of the hook and loop elements. In other words, the securing elements prevent the fibers and the hook and loop heads from becoming disengaged in the event of a load acting on the components. The securing elements thus make it possible to reinforce further a hook and loop connection established by means of the connecting device according to the invention between two components.

Securing elements that are assigned to a hook and loop element with a hook and loop head formed spherical, ellipsoid or cuboid in shape may be arranged in principle at any position along a circle around the hook and loop element adjacent to the hook and loop element. Securing elements that are assigned to a hook and loop element equipped with a hook-shaped hook and loop head, on the other hand, are preferably positioned adjacent to the hook and loop element in such a way, i.e., they extend preferably adjacent to the hook and loop element from the first or the second surface of the carrier in such a way, that free ends of the securing elements facing away from the first or the second surface of the carrier each oppose the free ends of the hook-shaped hook and loop heads of the hook and loop elements. The distance between the free end of a securing element and the hook and loop head should be great enough in this case that a fiber, which is integrated into a fiber composite component to be connected to the connecting device, can be led through between the free end of the securing element and the hook and loop head. The configuration of the securing elements and the hook and loop elements should therefore be adapted sensibly to the configuration of the fibers in the fiber composite components to be connected to the connecting device.

A hook and loop element that extends from the first surface of the carrier may be formed in one piece with a hook and loop element that extends from the second surface of the carrier. In addition or alternatively to this, a securing element that extends from the first surface of the carrier may be formed in one piece with a securing element that extends from the second surface of the carrier. Hook and loop elements and/or securing elements that are formed in one piece are preferably led through the carrier of the connecting device and facilitate a particularly secure and load-resistant connection of the components or component sections to be hook-and-loop fastened to one another by means of the connecting device.

The carrier of the connecting device according to the invention may be formed by a fiber prepreg. A fiber prepreg that is used to form the carrier of the connecting device may comprise a woven or non-woven fabric of reinforcing fibers, which are provided with a surface layer of an unhardened, for example duroplastic plastic material, in particular an epoxy resin material. The fibers may be present in the form of short fibers or continuous filaments. The carrier can then be hardened either separately, but preferably together with the components connected to one another by means of the connecting device, so that an integration of the carrier into the component material more or less takes place. The carrier then sensibly comprises the same materials as the components to be connected to one another by means of the connecting device. The fibers of the fiber prepreg used to manufacture the carrier may be carbon fibers, but also other suitable fibers, such as, e.g., glass fibers. The carrier preferably has a certain flexibility, so that the connecting device is also suitable for interacting with an curved surface of a component or component section to be connected to the connecting device. Moreover, a fiber prepreg used to manufacture the carrier is preferably constructed in such a way that hook and loop elements and/or securing elements can be led through the carrier in the manufacture of the connecting device.

The hook and loop elements and/or the securing elements of the connecting device according to the invention may comprise a fiber material. For example, the hook and loop elements and/or the securing elements may be manufactured from carbon fibers but also from other suitable fibers, such as, e.g., glass fibers. The hook and loop elements and/or the securing elements are sensibly manufactured from fibers that comprise same material as the fibers that are integrated into the components, which are provided for connection to the connecting device according to the invention. In particular when the components are subjected together with the connecting device to a hardening cycle, optimum integration of the connecting device into the component composite is guaranteed.

In a particularly preferred embodiment of the connecting device, the hook and loop elements and/or the securing elements comprise an electrically conductive material. Carbon fibers or metal, for example, lend themselves as conductive materials suitable for the manufacture of the hook and loop elements and/or the securing elements. In particular when the hook and loop elements and/or the securing elements penetrate the carrier, the hook and loop elements and/or the securing elements then create an electrically conductive connection between the components connected to one another by means of the connecting device. An electrical ground connection is thereby ensured between the components. Moreover, hook and loop elements and/or securing elements comprise an electrically conductive material may also be used to heat resin material surrounding the hook and loop elements and/or the securing elements inductively as part of a hardening process.

An assembly according to the invention comprises a first component, which comprises a fiber-reinforced composite material, and a second component, which likewise comprises a fiber-reinforced composite material. The components of the assembly according to the invention may contain reinforcing fibers of carbon present in the form of non-woven or woven fabrics as short fibers or continuous filaments. Furthermore, other suitable fibers, such as, e.g., glass fibers, may be used in the components. The components of the assembly according to the invention are preferably structural components, which are exposed in operation to corresponding loads. A component built into the assembly according to the invention may be an aircraft structural component, for example, such as an aircraft outer skin section, a frame or a stringer. The assembly according to the invention may also be composed of other load bearing aircraft components, however. The first and the second component of the assembly according to the invention are connected to one another by a hook and loop connection by means of a connecting device described above.

In the assembly according to the invention, the hook and loop elements and/or the securing elements of the connecting device extend from the first and/or the second surface of the carrier preferably substantially perpendicular to the fibers incorporated into the first and/or the second fiber composite component. In other words, the orientation of the hook and loop elements and/or securing elements is preferably adapted to the orientation of the fibers in the components. For example, a configuration is conceivable in which the carrier of the connecting device extends parallel to the fibers in the components. Hook and loop elements and/or securing elements oriented perpendicular to the first and/or the second surface of the carrier then extend, as desired, also perpendicular to the fibers in the components.

In a method according to the invention for manufacturing an assembly, first a first component, which comprises a fiber-reinforced composite material, is connected to a connecting device described above. Then a second component, which likewise comprises a fiber-reinforced composite material, is connected to the connecting devices connected to the first component, whereby a hook and loop connection arises between the first and the second component, manufactured by the connecting device.

If desired, the structural assembly comprising the first component, the connecting device and the second component may be subjected to a hardening process, through which both a matrix of the components comprising an unhardened resin material and a matrix of a carrier of the connecting device manufactured from a fiber prepreg are hardened. Depending on the matrix material of the components and the carrier, the hardening process may take place under increased pressure and/or at an increased temperature, if applicable also in an autoclave.

A connecting device described above, an assembly described above and/or a method described above for manufacturing an assembly may be used in a particularly advantageous manner in aircraft construction.

BRIEF DESCRIPTION OF THE DRAWINGS

Preferred embodiments of the invention are now explained in greater detail with reference to the enclosed schematic drawings, of which FIG. 5 shows a first assembly with a plurality of components, which are connected to one another by means of a connecting device according to FIGS. 1 to 3, FIG. 6 shows a second embodiment of an assembly, in which two sections of a component are connected to one another by means of a connecting device according to FIGS. 1 to 3, and FIG. 7 shows a third embodiment of an assembly in which slits introduced into a component are closed by means of a connecting device according to one of FIGS. 1 to 3.

DETAILED DESCRIPTION OF THE PREFERRED EMBODIMENTS

Figure 1:
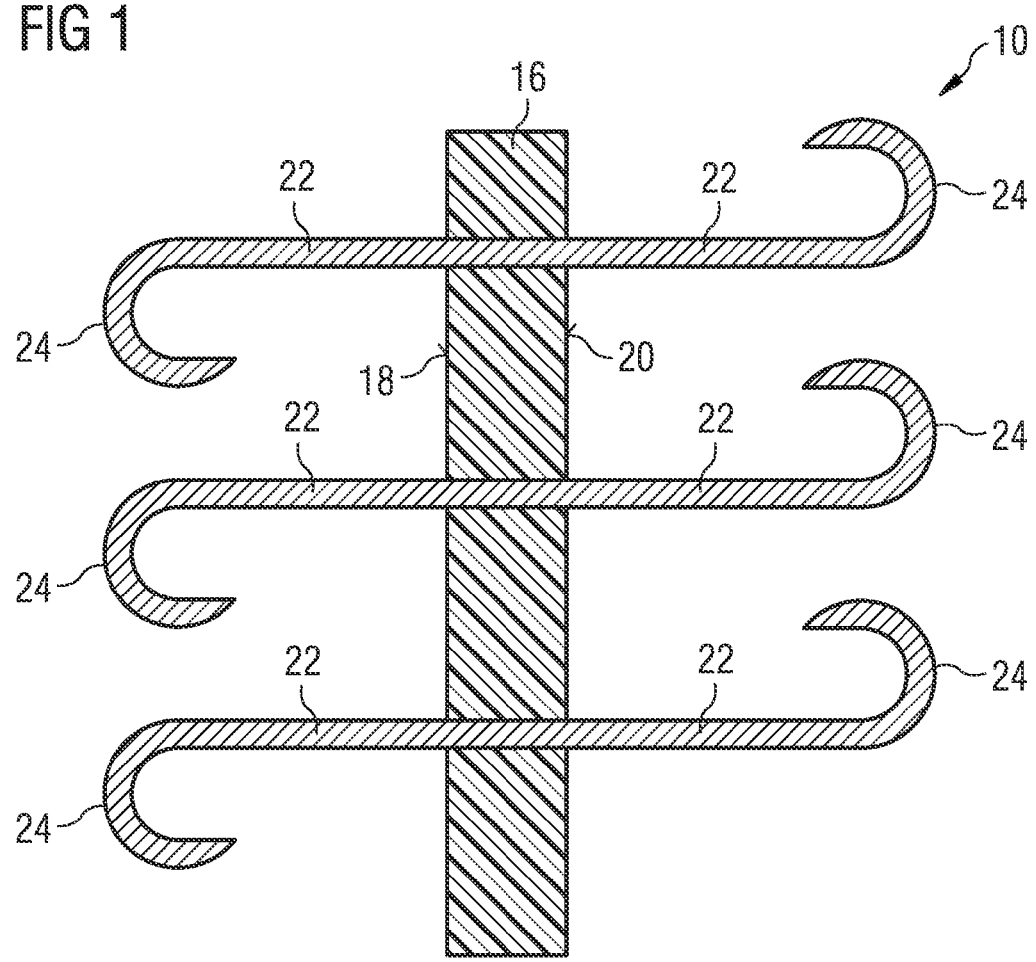
FIG. 1 shows a first embodiment of a connecting device for manufacturing a peeling-stress-resistant connection between two components.
Figure 2:
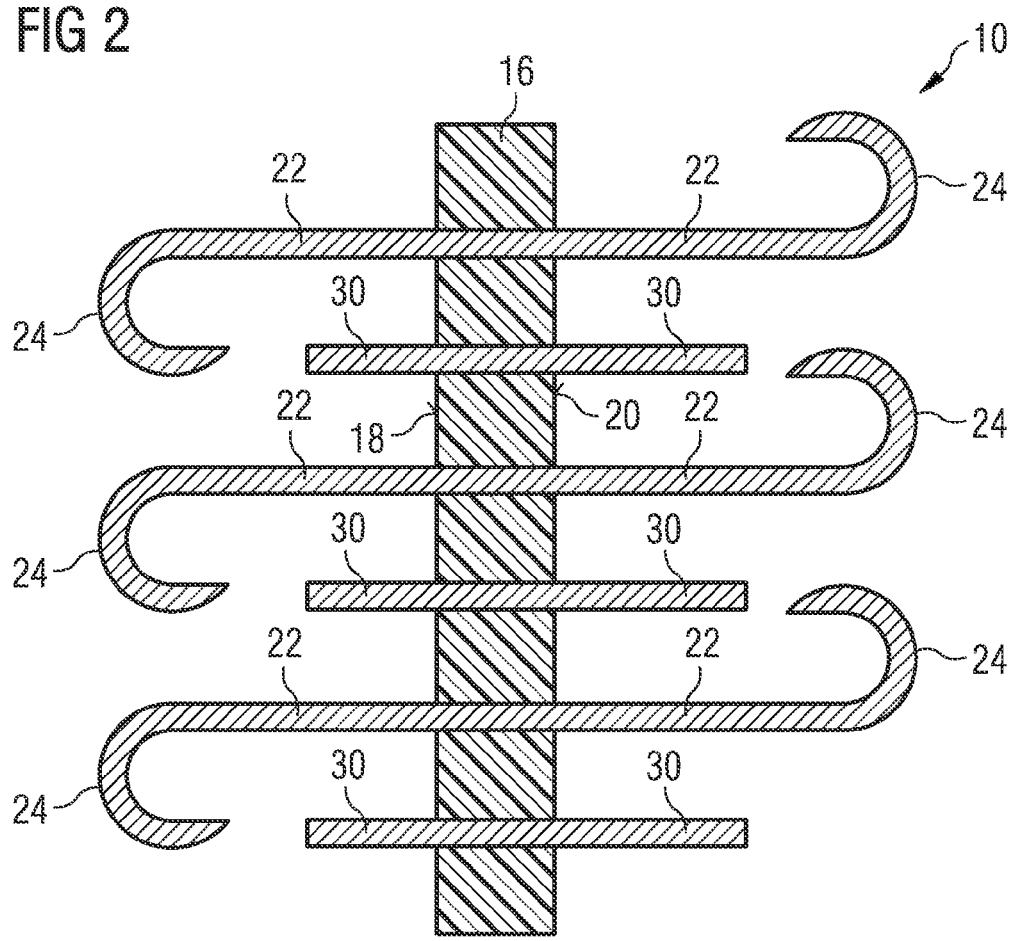
FIG. 2 shows a second embodiment of a connecting device for manufacturing a peeling-stress-resistant connection between two components.
Figure 3:
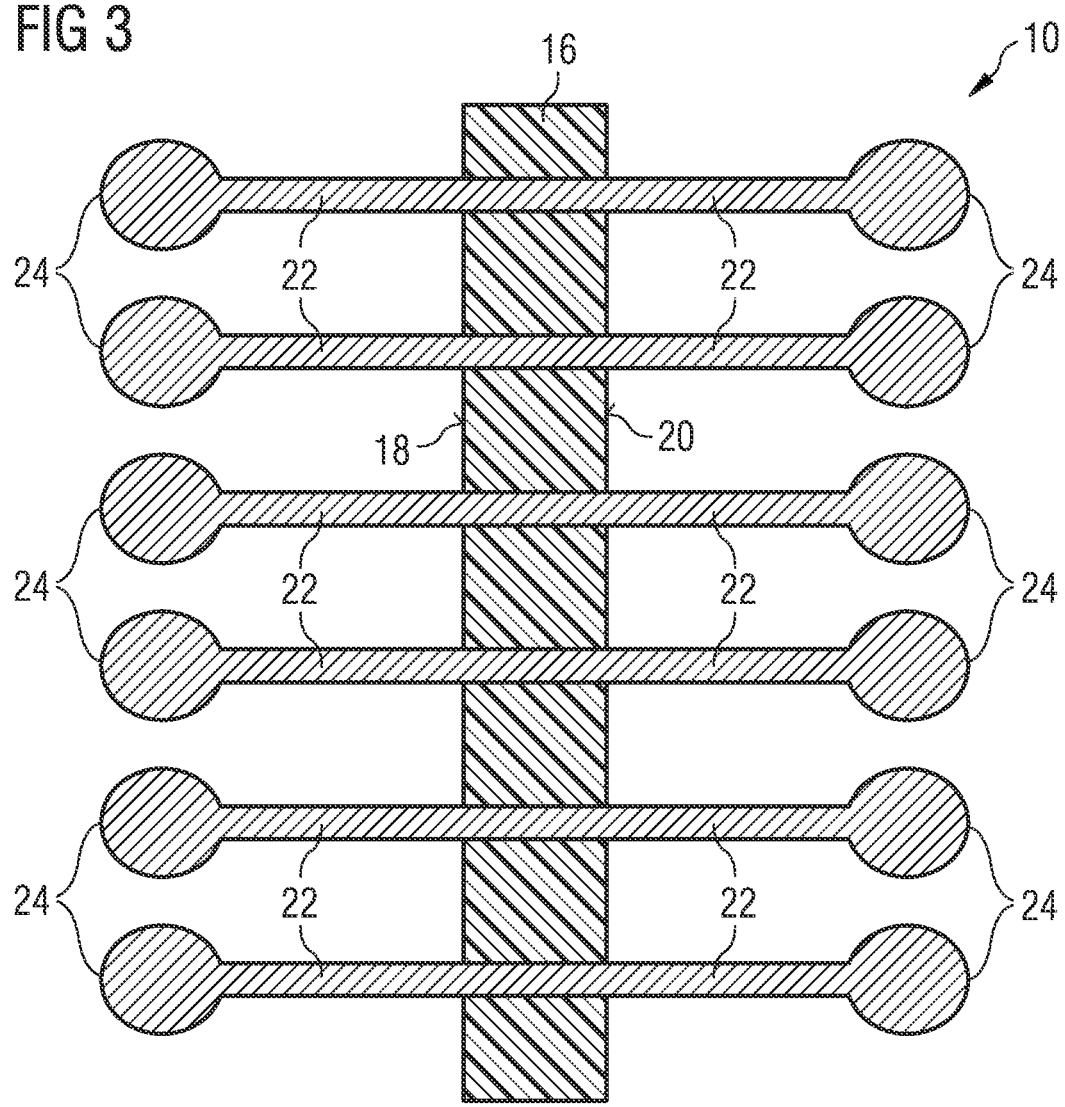
FIG. 3 shows a third embodiment of a connecting device for manufacturing a peeling-stress-resistant connection between two components.

In FIGS. 1 to 3, three embodiments are shown of a connecting device 10, which is suitable for manufacturing a peeling-stress-resistant hook and loop connection between two components 12, 14 (see FIGS. 4 and 5) or two component sections 12a, 12b (see FIGS. 6 and 7). The connecting device 10 comprises a carrier 16 with a first surface 18 and a second surface 20 opposing the first surface 18. The carrier 16 is formed by a fiber prepreg, which comprises a woven or non-woven fabric of reinforcing fibers, which are provided with a surface layer of an unhardened duroplastic plastic material, for example an epoxy resin material.

Figure 4:
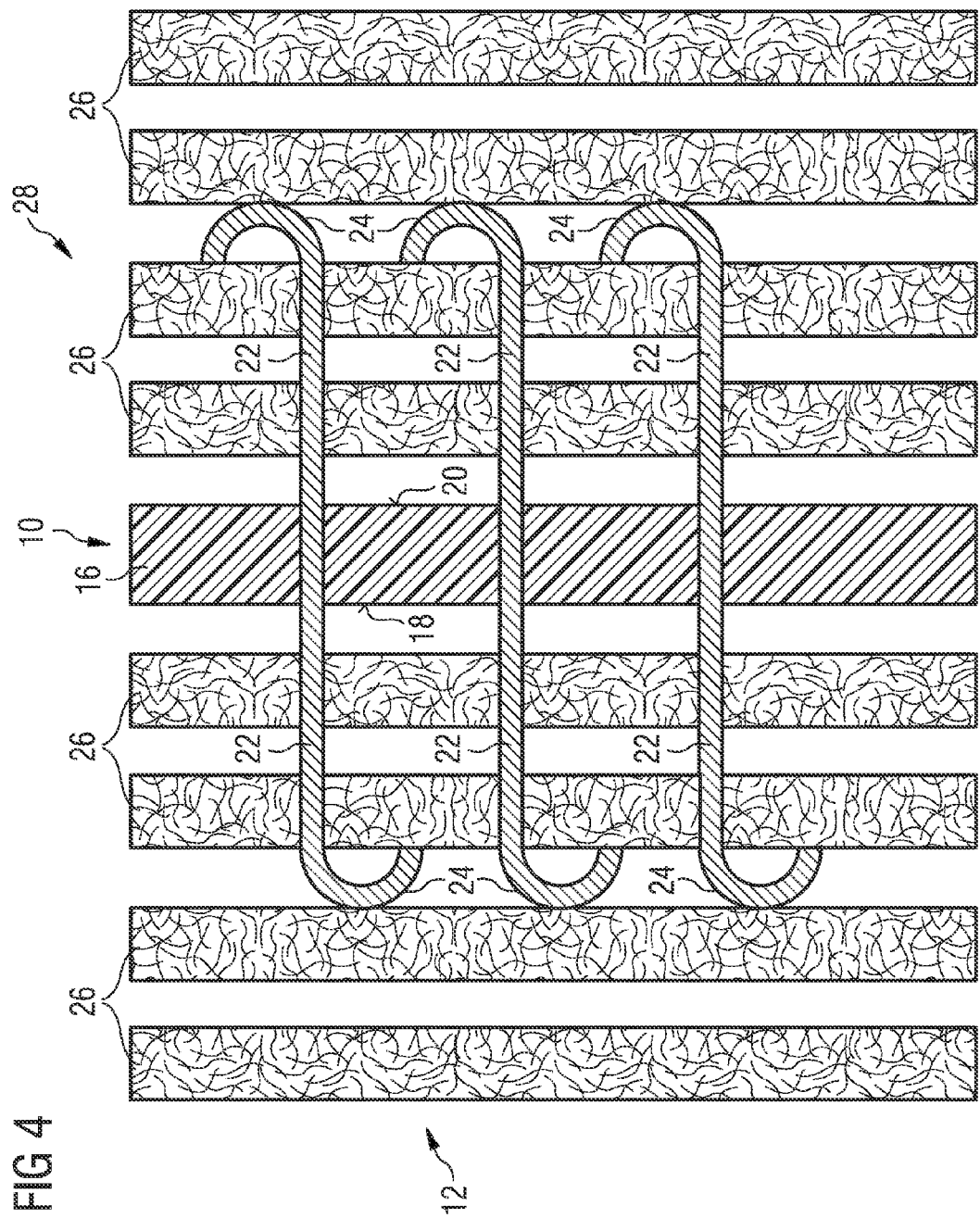
FIG. 4 shows a detailed illustration of an assembly, which comprises two components connected to one another by means of a connecting device according to FIG. 1.

The connecting device 10 further comprises a plurality of hook and loop elements 22, which extend both from the first and from the second surface 18, 20 of the carrier 16. The hook and loop elements 22 comprise an electrically conductive material, for example carbon fibers or a metal. At ends facing away from the first or the second surface 18, 20 of the carrier 16, the hook and loop elements 22 each have a hook and loop head 24. As shown in FIG. 4, the hook and loop head 24 is arranged to enter into a hook and loop connection with a component 12, 14 comprising a fiber-reinforced composite material, i.e., in particular the fibers 26 incorporated into the component 12, 14.

Since the connecting device 10 is provided with hook and loop elements 22 in the area of both surfaces 18, 20 of the carrier 16, the connecting device can be used to connect two components 12, 14 to one another by a hook and loop connection. The hook and loop elements 22 provide thereby a direct, non-yielding load path, via which stresses introduced into the components 12, 14 can be channelled away. The hook and loop connection manufactured between the components 12, 14 by the connecting device 10 is very peeling-stress-resistant due to this.

In the assembly 28 illustrated in FIG. 4, the components 12, 14 contain fibers 26 of carbon incorporated into a matrix of a duroplastic plastic. If the hook and loop elements 22 comprise a fiber material, the fiber material used for manufacturing the hook and loop elements 22 is preferably identical to the fiber material used for manufacturing the fibers 26 of the components 12, 14. Moreover, the material which is applied as a surface layer to the reinforcing fibers of the fiber prepreg forming the carrier 16 preferably corresponds to the plastic material that forms the matrix in the components 12, 14.

To manufacture the assembly 28 illustrated in FIG. 4, the first component 12 is first connected in the unhardened state to the connecting device 10 by the hook and loop elements 22 extending from the first surface 18 of the carrier 16 of the connecting device 10, i.e., the hook and loop heads 24 of the hook and loop elements 22, being brought into engagement with the fibers 26 of the component 12. Then the second component 14 is connected to the connecting device 10 by the hook and loop elements 22 extending from the second surface 20 of the carrier 16 of the connecting device 10, i.e., the hook and loop heads 24 of these hook and loop elements 22, being brought into engagement with the fibers 26 of the component 14. A hook and loop connection thereby arises between the first and second component 12, 14.

If the assembly 28 is not exposed to any high mechanical loads, the hook and loop connection manufactured by the connecting device 10 can already be sufficiently stable. Assemblies 28 under higher loads, however, are sensibly subjected to a hardening process, which may take place, depending on the plastic material contained in the carrier 16 and forming the matrix of the components 12, 14, also under increased pressure and/or at an increased temperature in the autoclave. In other words, the connection of the components 12, 14 to the connecting device 10 takes place in the unhardened state of the components 12, 14 and of the fiber prepreg forming the carrier 16 of the connecting device 10. An integrated assembly is then formed by the hardening process.

In the embodiments of a connecting device 10 shown in FIGS. 1 to 3, the hook and loop elements 22 extend from the first or the second surface 18, 20 of the carrier 16 substantially perpendicular to the first and the second surface 18, 20 of the carrier 16. Moreover, the hook and loop elements 22 extending from the first surface 18 of the carrier 16 are formed in one piece with the hook and loop elements 22 extending from the second surface 18 of the carrier 16, i.e., the hook and loop elements 22 penetrate the carrier 16. The hook and loop elements 22 comprising an electrically conductive material thus create an electrically conductive connection between the components 12, 14. A ground connection of the components 12, 14 is guaranteed thereby.

Moreover, in the connected state of the connecting device 10 to the components 12, 14, the hook and loop elements 22 of the connecting device 10 extend from the first and/or the second surface 18, 20 of the carrier 16 substantially perpendicular to the fibers 26 incorporated into the components 12, 14. The structural assembly 28 illustrated in FIG. 4 is thus configured such that the first and the second surface 18, 20 of the carrier 16 are oriented substantially parallel to the fibers 26 of the components 12, 14. The hook and loop elements 22 extending substantially perpendicular to the surfaces 18, 20 of the carrier 16 are thereby necessarily oriented substantially perpendicular to the fibers 26 incorporated into the components 12, 14.

In the embodiment of a connecting device 10 illustrated in FIG. 1, the hook and loop heads 24 of the hook and loop elements 22 are formed hook-shaped, i.e., the hook and loop elements 22 each comprise a section extending from the first or the second surface 18, 20 of the carrier 16, adjoining which section is a bent hook-shaped hook and loop head 24. A free end of the hook-shaped hook and loop head 24, which may be formed blunt or sharp as required, faces the first or the second surface 18, 20 of the carrier 16. Hook-shaped hook and loop heads 24 are especially well suited to interacting with fibers 26 incorporated into the components 12, 14, which fibers extend parallel to the surfaces 18, 20 of the carrier 16.

A particularly durable hook and loop connection between two structural components 12, 14 can be manufactured by a connecting device 10 illustrated in FIG. 2, which device comprises additional securing elements 30 as well as hook and loop elements 22. The securing elements 30 are formed pin-shaped and, like the hook and loop elements 22, penetrate the carrier 16 formed by a fiber prepreg. The securing elements 30 comprise the same material as the hook and loop elements 22. Each securing element 30 is assigned to a hook and loop element 22 and extends adjacent to the hook and loop element 22 parallel to the hook and loop element 22 from the first or the second surface 18, 20 of the carrier 16.

Ends of the securing elements 30 facing away from the first or the second surface 18, 20 of the carrier 16 are each arranged at a shorter distance from the first or the second surface 18, 20 of the carrier 16 than the hook and loop head 24 of the hook and loop elements 22. In other words, the extension of the securing elements 30 perpendicular to the surfaces 18, 20 of the carrier 16 is shorter than the extension of the hook and loop elements 22 perpendicular to the surfaces 18, 20 of the carrier 16. In particular, the securing elements 30 are each arranged adjacent to a hook and loop element 22 in such a way that the free end of the securing elements 30 facing away from the first or the second surface 18, 20 of the carrier 16 opposes the free end of the hook-shaped hook and loop head 24 of the hook and loop element 22 facing the first and the second surface 18, 20 of the carrier 16.

The distance between the free end of the securing element 30 and the free end of the hook-shaped hook and loop head 24 is chosen so that a fiber 26 integrated into a component 12, 14 can be led through the gap formed between the free end of the securing element 30 and the free end of the hook and loop head 24. The securing elements 30 prevent the fibers 26 of the components 12, 14 and the hook and loop heads 24 of the hook and loop elements 22 from becoming disengaged, however, when corresponding loads act on the components 12, 14. Otherwise the construction and mode of operation of the connecting device 10 according to FIG. 2 correspond to the construction and mode of operation of the connecting device 10 illustrated in FIG. 1.

Finally, FIG. 3 shows a connecting device 10 in which the hook and loop elements 22 are provided with spherical hook and loop heads 24. The spherical hook and loop heads 24 are likewise suitable for interacting with fibers 26 integrated into the components 12, 14 and are gentler on the fibers compared with hook-shaped hook and loop heads 24. The hook and loop connection manufactured between two components 12, 14 by a connecting device 10 according to FIG. 3 is possibly weaker than a hook and loop connection manufactured between two components 12, 14 by a connecting device 10 according to one of FIG. 1 or 2, however. A connecting device 10 shown in FIG. 3, in which the hook and loop elements 22 are provided with spherical hook and loop heads 24, can also comprise additional securing elements described above in connection with an arrangement with hook-shaped hook and loop heads. Otherwise the construction and mode of operation of the connecting device 10 according to FIG. 3 correspond to the construction and mode of operation of the connecting device 10 illustrated in FIG. 1.

The connecting device 10 is particularly well suited to the manufacture of hook and loop connections between load-bearing structural components in aircraft construction. For example, the connecting device 10 may be used in the connection of a first component 12 in the form of an aircraft outer skin section comprising a fiber-reinforced composite material to a second component 14 in the form of a stringer comprising a fiber-reinforced composite material (see FIG. 5). In particular, the connecting device 10 may be installed in the area of points of a gore 32, which are particularly subject to peeling stress loading.

FIG. 6 illustrates a structural assembly 28, in which a structural component 12 is formed into a loop and then sections 12a, 12b of the component 12 opposing one another are connected to one another. The connection existing in the area of the component sections 12a, 12b mounted over one another is reinforced by means of a connecting device 10 and is thereby particularly resistant to peeling stress.

Finally, FIG. 7 shows a structural assembly 28, in which a positive-fit insert 38, such as, e.g., a thread or the like is introduced into a component 12. Sections of the component 12 in the extension of the tips of the thread turns 40 of the positive-fit insert 38 are each reinforced by connecting devices 10, due to which the resistance of the structural assembly 28 to tensile stresses perpendicular to the thread turns 40 of the positive-fit insert 38 is increased.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A connecting device for manufacturing a peeling-stress-resistant connection between two components comprising:
   a carrier, comprising a first surface and a second surface opposing the first surface,
   a plurality of hook and loop elements, which extend both from the first and from the second surface of the carrier and each have, at their free ends facing away from the first or the second surface of the carrier, a hook and loop head, which is arranged to enter into a hook and loop connection with fibers integrated into a component or a component section at the respective one of the first and second surface, each component comprising a fiber-reinforced composite material, and
   a plurality of securing elements, which are each assigned to a hook and loop element and extend from at least one of the first and the second surface of the carrier adjacent to the hook and loop element, wherein free ends of the securing elements facing away from the first or the second surface are each arranged at a shorter distance from the first or the second surface of the carrier than the hook and loop head of the hook and loop element, each securing element configured to prevent the hook and loop head of the assigned hook and loop element and the fibers of the component or component section caught by the hook and loop head from becoming disengaged,
   wherein a securing element, which is assigned to a hook and loop element equipped with a hook-shaped hook and loop head, extends adjacent to the hook and loop element from one of the first and the second surface of the carrier in such a way that the free end of the securing element facing away from the one of the first and the second surface of the carrier opposes a free end of the hook-shaped hook and loop head of the hook and loop element facing the one of the first and the second surface of the carrier.

2. The connecting device according to claim 1, wherein the hook and loop elements extend from the first or the second surface of the carrier substantially perpendicular to the first or the second surface of the carrier.

3. The connecting device according to claim 1, wherein at least a portion of the hook and loop heads of the hook and loop elements is formed hook-shaped.

4. The connecting device according to claim 1, wherein at least a portion of the hook and loop heads of the hook and loop elements is formed one of spherical, ellipsoid and cuboid in shape.

5. The connecting device according to claim 1, wherein the plurality of securing elements extend substantially parallel to the hook and loop element.

6. The connecting device according to claim 1, wherein a hook and loop element extending from the first surface of the carrier is formed in one piece with a hook and loop element extending from the second surface of the carrier.

7. The connecting device according to claim 1, wherein a securing element extending from the first surface of the carrier is formed in one piece with a securing element extending from the second surface of the carrier.

8. The connecting device according to claim 1, wherein the carrier is formed by a fiber prepreg.

9. The connecting device according to claim 1, wherein at least one of the hook and loop elements and the securing elements comprises a fiber material.

10. The connecting device according to claim 1, wherein at least one of the hook and loop elements and the securing elements comprises an electrically conductive material.

11. An assembly comprising:
- a first component, which comprises a fiber-reinforced composite material, and
- a second component, which comprises a fiber-reinforced composite material, wherein the first and the second component are connected to one another by means of a connecting device according to claim 1 by a hook and loop connection.

12. The assembly according to claim 11, wherein at least one of the hook and loop elements and the securing elements of the connecting device extend from at least one of the first and the second surface of the carrier of the connecting device substantially perpendicular to the fibers incorporated into the at least one of the first and the second component.

13. A method for manufacturing an assembly comprising the steps:
- connecting a first component, which comprises a fiber-reinforced composite material, to a connecting device according to claim 1, and
- connecting a second component, which comprises a fiber-reinforced composite material, to the connecting device connected to the first component, whereby a hook and loop connection arises between the first and the second component.

14. The method according to claim 13, wherein the assembly comprising the first component, the connecting device and the second component is subjected to a hardening process.

15. The method according to claim 14, wherein the hardening process is carried out under increased pressure.

16. The method according to claim 15, wherein the hardening process is carried out under an increased temperature.

* * * * *